US011961447B2

(12) United States Patent
Xu

(10) Patent No.: US 11,961,447 B2
(45) Date of Patent: Apr. 16, 2024

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventor: Zuoyuan Xu, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 50 days.

(21) Appl. No.: 17/780,040

(22) PCT Filed: May 20, 2022

(86) PCT No.: PCT/CN2022/094132

§ 371 (c)(1),
(2) Date: May 26, 2022

(87) PCT Pub. No.: WO2023/216304

PCT Pub. Date: Nov. 16, 2023

(65) Prior Publication Data

US 2023/0360578 A1 Nov. 9, 2023

(30) Foreign Application Priority Data

May 9, 2022 (CN) ......................... 202210500835.8

(51) Int. Cl.
*G09G 3/20* (2006.01)

(52) U.S. Cl.
CPC ... *G09G 3/2085* (2013.01); *G09G 2300/0426* (2013.01); *G09G 2300/0804* (2013.01)

(58) Field of Classification Search
CPC ......... G09G 3/2085; G09G 2300/0426; G09G 2300/0804
See application file for complete search history.

(56) References Cited

U.S. PATENT DOCUMENTS 10,008,174 B2 * 6/2018 Wu ........................ H01L 27/124
2010/0013743 A1 * 1/2010 Cho ...................... G02F 1/1345 345/55

(Continued)

FOREIGN PATENT DOCUMENTS

CN 107065336 A 8/2017
CN 109634003 A 4/2019

(Continued)

OTHER PUBLICATIONS

Chinese Journal of Liquid Crystals and Displays Issue 5 Oct. 15, 2015 Nnew In—Zn—O thin film transistors gate driver circuit employing input block multiplex structure Zhang, Lirong etc.

(Continued)

*Primary Examiner* — Ricardo Osorio
(74) *Attorney, Agent, or Firm* — Rivka Friedman

(57) ABSTRACT

The present disclosure provides a display panel and a display device, including a display area and a non-display area. The non-display area includes a circuit area and a fan-out wiring area arranged side by side with the display area along a first direction in sequence. The fan-out wiring area includes a plurality of first fan-out wirings with lengths gradually decreasing along a second direction perpendicular to the first direction. The circuit area includes a plurality of first sub-circuit areas in a one-to-one correspondence with the plurality of first fan-out wirings. Widths of the plurality of the first sub-circuit areas in the first direction gradually decrease along the second direction.

18 Claims, 4 Drawing Sheets

(56) References Cited

U.S. PATENT DOCUMENTS

| | | | | |
|---|---|---|---|---|
| 2017/0047356 | A1 * | 2/2017 | Lee | G02F 1/136259 |
| 2017/0062408 | A1 | 3/2017 | Chung | |
| 2021/0225879 | A1 | 7/2021 | Asai et al. | |
| 2022/0059479 | A1 * | 2/2022 | Shin | G02F 1/13458 |

FOREIGN PATENT DOCUMENTS

| | | | | | |
|---|---|---|---|---|---|
| CN | 109656067 | A | | 4/2019 | |
| CN | 109671742 | A | | 4/2019 | |
| CN | 110018598 | A | * | 7/2019 | G02F 1/13452 |
| CN | 110364082 | A | | 10/2019 | |
| CN | 111323949 | A | | 6/2020 | |
| CN | 111564111 | A | | 8/2020 | |
| CN | 111951669 | A | * | 11/2020 | G09F 9/00 |
| CN | 112150933 | A | * | 12/2020 | |
| CN | 112867244 | A | | 5/2021 | |
| CN | 112867244 | A | * | 5/2021 | H05K 1/118 |
| CN | 113093946 | A | | 7/2021 | |
| CN | 113296630 | A | * | 8/2021 | |
| CN | 113470558 | A | * | 10/2021 | |
| CN | 214848636 | U | | 11/2021 | |
| CN | 114419996 | A | | 4/2022 | |
| CN | 115132760 | A | * | 9/2022 | |
| CN | 111564111 | B | * | 3/2023 | G09F 9/30 |
| JP | 7108350 | B1 | * | 7/2022 | |
| WO | 2015178334 | A1 | | 11/2015 | |
| WO | WO-2020211200 | A1 | * | 10/2020 | G02F 1/13452 |
| WO | 2021120164 | A1 | | 6/2021 | |

OTHER PUBLICATIONS

International Search Report in International application No. PCT/CN2022/094132, dated Dec. 19, 2022.

Written Opinion of the International Search Authority in International application No. PCT/CN2022/094132, dated Dec. 19, 2022.

Chinese Office Action issued in corresponding Chinese Patent Application No. 202210500835.8 dated Nov. 18, 2022, pp. 1-6.

* cited by examiner

DISPLAY PANEL AND DISPLAY DEVICE

FIELD OF INVENTION

The present application relates to the field of display technology, and particularly relates to a display panel and a display device.

BACKGROUND OF INVENTION

With development of display technology, display devices require thinness and narrower frames to enhance user experience.

FIG. 1 is a schematic diagram of an exemplary display panel 1' including a display area 2' and a non-display area 3'. Wherein a demultiplexer (demux) circuit area 4', a fan-out wiring area 5', and a bonding area 6' are arranged sequentially in the non-display area 3'. Generally, the non-display area where the demultiplexer circuit area 4', the fan-out wiring area 5', and the bonding area 6' are arranged becomes a lower frame area.

Wherein demultiplexers arranged in the demultiplexer circuit area 4' are configured to transmit data signals to data lines in the display panel 1' to match an imbalance between numbers of pins of a driving chip and signal lines in the display area, and realize time-sharing transmission of signals. Since lengths of fan-out wirings on both sides in the fan-out wiring area 5' are greater, that is, impedance is larger, to meet a pixel charging demand, a size of the demultiplexer circuit area 4' needs to be designed to be larger, resulting in more spaces being occupied by the demultiplexer circuit area 4', which is not conducive to realizing a narrow frame.

TECHNICAL PROBLEMS

The present disclosure provides a display panel and a display device to reduce areas occupied by a circuit area and a fan-out wiring area of a non-display area to realize a narrow frame on a basis of meeting a pixel charging demand.

TECHNICAL SOLUTIONS

The present disclosure provides a display panel. The display panel includes a display area and a non-display area arranged around the display area. The non-display area includes a circuit area arranged adjacent to the display area in a first direction and a fan-out wiring area arranged on a side of the circuit area away from the display area;

the fan-out wiring area includes a first fan-out wiring group, the first fan-out wiring group includes a plurality of first fan-out wirings with lengths gradually decreasing in a second direction, and the second direction and the first direction are perpendicular to each other. The circuit area includes a plurality of first sub-circuit areas sequentially distributed in the second direction and connected with the plurality of first fan-out wirings in a one-to-one correspondence;

sides of the plurality of first sub-circuit areas close to the display area are parallel to the second direction and are arranged on a same straight line, and widths of the plurality of the first sub-circuit areas in the first direction gradually decrease in the second direction.

In an embodiment of the present disclosure, sides of the plurality of first sub-circuit areas away from the display area are in a stepped shape.

In an embodiment of the present disclosure, each of the first sub-circuit areas is disposed with a first demultiplexer circuit, the first demultiplexer circuit includes at least two first switching transistors electrically connected with the corresponding first fan-out wirings; and a number of the first switching transistors in each of the first sub-circuit areas is same;

channel sizes of the first switching transistors are positively related to the widths of the corresponding first sub-circuit areas in the first direction.

In an embodiment of the present disclosure, the non-display area further includes a bonding area arranged on a fan-out wiring area away from the circuit area;

each of the first fan-out wirings includes a first wiring segment, a second wiring segment, and a third wiring segment connected in sequence; an end of the first wiring segment is connected with a corresponding one of the first sub-circuit areas, and another end of the first wiring segment is connected with an end of the second wiring segment at a first node; another end of the second wiring segment is connected with an end of the third wiring segment at a second node, and another end of the third wiring segment is connected with the bonding area;

wiring segments formed by connecting the first nodes in the plurality of first fan-out wirings with each other are arranged on a same straight line, and an included angle between an extending direction and the first direction is an acute angle; wiring segments formed by connecting the second nodes in the plurality of first fan-out wirings with each other are arranged on a same straight line, and an included angle between an extending direction and the first direction is an acute angle.

In an embodiment of the present disclosure, the fan-out wiring area further includes a second fan-out wiring group arranged side by side with the first fan-out wiring group in the second direction; the first fan-out wirings with smaller lengths in the first fan-out wiring group are arranged close to the second fan-out wiring group; and the second fan-out wiring group includes a plurality of second fan-out wirings with lengths gradually decreasing in a direction toward the first fan-out wiring group;

the circuit area further includes a plurality of second sub-circuit areas arranged side by side with the first sub-circuit areas in the second direction; the plurality of second sub-circuit areas are electrically connected to the plurality of second fan-out wirings in a one-to-one correspondence; sides of the plurality of second sub-circuit areas and the plurality of first sub-circuit areas close to the display area are arranged on the same straight line, and widths of the plurality of the second sub-circuit areas in the first direction gradually decrease in a direction toward the first sub-circuit areas.

In an embodiment of the present disclosure, each of the second sub-circuit areas includes a second demultiplexer circuit, the second demultiplexer circuit includes at least two second switching transistors electrically connected with the corresponding second fan-out wirings; and a number of the second switching transistors in each of the second sub-circuit areas is same;

channel sizes of the second switching transistors are positively related to the widths of the corresponding second sub-circuit areas in the first direction.

In an embodiment of the present disclosure, the first fan-out wiring group and the second fan-out wiring group are axially symmetrical in the first direction, and the plurality of first sub-circuit areas and the plurality of second sub-circuit areas are axially symmetrical in the first direction.

In an embodiment of the present disclosure, the fan-out wiring area further includes a third fan-out wiring group arranged between the first fan-out wiring group and the second fan-out wiring group; the third fan-out wiring group includes a plurality of third fan-out wirings, and a length of any one of the third fan-out wirings is less than the length of any one of the first fan-out wirings and any one of the second fan-out wirings arranged adjacent to the third fan-out wiring group;

the circuit area further includes a plurality of third sub-circuit areas arranged between the plurality of first sub-circuit areas and the plurality of second sub-circuit areas and distributed in the second direction; and the plurality of third sub-circuit areas are electrically connected to the plurality of third fan-out wirings in a one-to-one correspondence;

sides of the plurality of third sub-circuit areas and the plurality of first sub-circuit areas close to the display area are arranged on the same straight line, and sides of the plurality of third sub-circuit areas away from the display area are arranged on a same straight line and parallel to the second direction; and widths of the plurality of the third sub-circuit areas in the first direction are less than the widths of any one of the first sub-circuit areas and any one of the second sub-circuit areas adjacent to the third sub-circuit areas in the first direction.

In an embodiment of the present disclosure, each of the plurality of third sub-circuit areas is disposed with a third demultiplexer circuit, the third demultiplexer circuit includes at least two third switching transistors electrically connected with the corresponding third fan-out wirings; and a number of the third switching transistors in each of the third sub-circuit areas is same;

channel sizes of the second switching transistors are positively related to widths of the corresponding third sub-circuit areas in the first direction.

In an embodiment of the present disclosure, a number of the first switching transistors in the first sub-circuit areas is equal to a number of the second switching transistors in the second sub-circuit areas, and equal to a number of the third switching transistors in the third sub-circuit areas.

The present disclosure provides a display device, including a display panel and a driving circuit board electrically connected with the display panel, and the driving circuit board is electrically connected with a side of the first fan-out wiring group away from the circuit area.

In the display device provided by the present disclosure, sides of the plurality of first sub-circuit areas away from the display area are in a stepped shape.

In the display device provided by the present disclosure, each of the first sub-circuit areas is disposed with a first demultiplexer circuit, the first demultiplexer circuit includes at least two first switching transistors electrically connected with the corresponding first fan-out wirings; and a number of the first switching transistors in each of the first sub-circuit areas is same;

channel sizes of the first switching transistors are positively related to widths of the corresponding first sub-circuit areas in a first direction.

In the display device provided by the present disclosure, a non-display area further includes a bonding area arranged on a fan-out wiring area away from the circuit area;

each of the first fan-out wirings includes a first wiring segment, a second wiring segment, and a third wiring segment connected in sequence; an end of the first wiring segment is connected with a corresponding one of the first sub-circuit areas, and another end of the first wiring segment is connected with an end of the second wiring segment at a first node; another end of the second wiring segment is connected with an end of the third wiring segment at a second node, and another end of the third wiring segment is connected with the bonding area;

wiring segments formed by connecting the first nodes in the plurality of first fan-out wirings with each other are arranged on a same straight line, and an included angle between an extending direction and the first direction is an acute angle; wiring segments formed by connecting the second nodes in the plurality of first fan-out wirings are arranged on a same straight line, and an included angle between an extending direction of the wiring segments and the first direction is an acute angle.

In the display device provided by the present disclosure, the fan-out wiring area further includes a second fan-out wiring group arranged side by side with the first fan-out wiring group in a second direction; the first fan-out wirings with smaller lengths in the first fan-out wiring group are arranged close to the second fan-out wiring group; and the second fan-out wiring group includes a plurality of second fan-out wirings with lengths gradually decreasing in a direction toward the first fan-out wiring group;

the circuit area further includes a plurality of second sub-circuit areas arranged side by side with the first sub-circuit areas in the second direction; the plurality of second sub-circuit areas are electrically connected to the plurality of second fan-out wirings in a one-to-one correspondence; sides of the plurality of second sub-circuit areas close to the display area and the sides of the plurality of first sub-circuit areas adjacent to the display area are arranged on the same straight line, and widths of the plurality of second sub-circuit areas in the first direction gradually decrease in a direction toward the first sub-circuit areas.

In the display device provided by the present disclosure, each of the second sub-circuit areas includes a second demultiplexer circuit, the second demultiplexer circuit includes at least two second switching transistors electrically connected with the corresponding second fan-out wirings; and a number of the second switching transistors in each of the second sub-circuit areas is same;

channel sizes of the second switching transistors are positively related to widths of the corresponding second sub-circuit areas in the first direction.

In the display device provided by the present disclosure, the first fan-out wiring group and the second fan-out wiring group are axially symmetrical in the first direction, and the plurality of first sub-circuit areas and the plurality of second sub-circuit areas are axially symmetrical in the first direction.

In the display device provided by the present disclosure, the fan-out wiring area further includes a third fan-out wiring group located between the first fan-out wiring group and the second fan-out wiring group; the third fan-out wiring group includes a plurality of third fan-out wirings, and a length of any one of the third fan-out wirings is less than the length of any one of the first fan-out wirings arranged adjacent to the third fan-out wiring group and a length of any one of the second fan-out wirings arranged adjacent to the third fan-out wiring group;

the circuit area further includes a plurality of third sub-circuit areas arranged between the plurality of first sub-circuit areas and the plurality of second sub-circuit areas and distributed in the second direction; and the plurality of third sub-circuit areas are electrically connected to the plurality of third fan-out wirings in a one-to-one correspondence;

sides of the plurality of third sub-circuit areas close to the display area and the sides of the plurality of first sub-circuit areas close to the display area are arranged on a same straight line, and sides of the plurality of third sub-circuit areas away from the display area are arranged on a same straight line and parallel to the second direction; and widths of the plurality of third sub-circuit areas in the first direction is less than the width of any one of the first sub-circuit areas adjacent to the third sub-circuit areas in the first direction and the width of any one of the second sub-circuit areas adjacent to the third sub-circuit areas in the first direction.

In the display device provided by the present disclosure, each of the plurality of third sub-circuit areas is disposed with a third demultiplexer circuit, the third demultiplexer circuit includes at least two third switching transistors electrically connected with the corresponding third fan-out wirings; and a number of the third switching transistors in each of the third sub-circuit areas is same;

channel sizes of the third switching transistors are positively related to widths of the corresponding third sub-circuit areas in the first direction.

In the display device provided by the present disclosure, a number of the first switching transistors in the first sub-circuit areas is equal to a number of the second switching transistors in the second sub-circuit areas, and equal to a number of the third switching transistors in the third sub-circuit areas.

BENEFICIAL EFFECTS

Compared with prior art, the present disclosure provides a display panel and a display device. Lengths of a plurality of first fan-out wirings in a fan-out wiring area of the display panel gradually decrease along a second direction, that is, impedance gradually decreases, on basis of meeting a pixel charging demand, widths of a plurality of first sub-circuit areas correspondingly connected to the plurality of the first fan-out wirings in a circuit area in a first direction gradually decrease along the second direction, so that a side of the circuit area away from a display area is in a concave shape, thereby effectively reducing an area occupied by the circuit area, making the fan-out wiring area move towards the display area to realize a narrow frame.

DETAILED DESCRIPTION OF EMBODIMENTS

Figure 1:
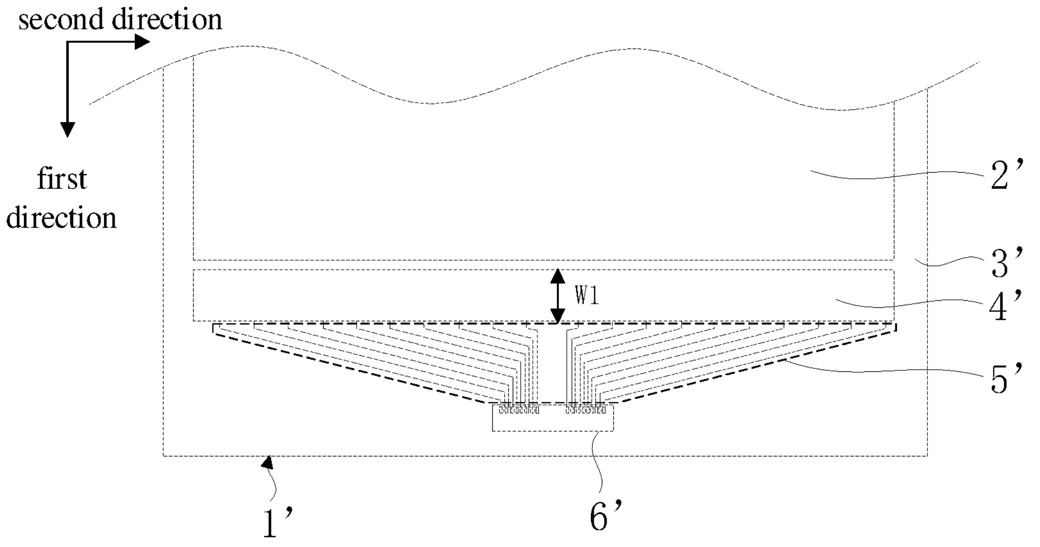
FIG. 1 (Prior Art)
FIG. 1 a structural schematic diagram of an exemplary display panel.

The technical solutions in the embodiments of the present disclosure will be described clearly and completely hereafter with reference to the accompanying drawings. Apparently, the described embodiments are only a part of but not all embodiments of the present disclosure. All other embodiments obtained by persons of ordinary skill in the art based on the embodiments of the present disclosure without creative efforts shall fall within the protection scope of the present disclosure.

In the description of the present disclosure, it should be understood that terms such as “center,” “longitudinal,” “lateral,” “length,” “width,” “thickness,” “upper,” “lower,” “front,” “rear,” “left,” “right,” “vertical,” “horizontal,” “top,” “bottom,” “inside,” “outside,” “clockwise,” “counter-clockwise” as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as “first” and “second” are used herein for purposes of description and are not intended to indicate or imply relative importance or significance. Thus, features limited by “first” and “second” are intended to indicate or imply including one or more than one these features. In the description of the present disclosure, “a plurality of” relates to two or more than two, unless otherwise specified.

In the description of the present disclosure, it should be noted that unless there are express rules and limitations, the terms such as “mount,” “connect,” and “bond” should be comprehended in broad sense. For example, it can mean a permanent connection, a detachable connection, or an integrated connection; it can mean a mechanical connection, an electrical connection, or can communicate with each other; it can mean a direct connection, an indirect connection by an intermediate, or an inner communication or an inter-reaction between two elements. A person skilled in the art should understand the specific meanings in the present disclosure according to specific situations.

In the description of the present disclosure, unless specified or limited otherwise, it should be noted that, a structure in which a first feature is “on” or “beneath” a second feature may include an embodiment in which the first feature directly contacts the second feature and may also include an embodiment in which an additional feature is formed between the first feature and the second feature so that the first feature does not directly contact the second feature. Furthermore, a first feature “on,” “above,” or “on top of” a second feature may include an embodiment in which the first feature is right “on,” “above,” or “on top of” the second feature and may also include an embodiment in which the first feature is not right “on,” “above,” or “on top of” the second feature, or just means that the first feature has a sea level elevation greater than the sea level elevation of the second feature. While first feature “beneath,” “below,” or “on bottom of” a second feature may include an embodiment in which the first feature is right “beneath,” “below,” or “on bottom of” the second feature and may also include an embodiment in which the first feature is not right “beneath,” “below,” or “on bottom of” the second feature, or just means that the first feature has a sea level elevation less than the sea level elevation of the second feature.

The disclosure herein provides many different embodiments or examples for realizing different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

In an exemplary display panel 1' shown in FIG. 1, since lengths of fan-out wirings on both sides in a fan-out wiring area 5' are greater, that is, impedance is larger, in order to meet a pixel charging demand, a size of a demultiplexer circuit area 4' is usually designed to be greater generally, and a width of the demultiplexer circuit area 4' in a first direction is equal everywhere, for example, the width is W1, resulting in more spaces being occupied by the demultiplexer circuit area 4', which is not conducive to realizing a narrow frame.

Figure 2:
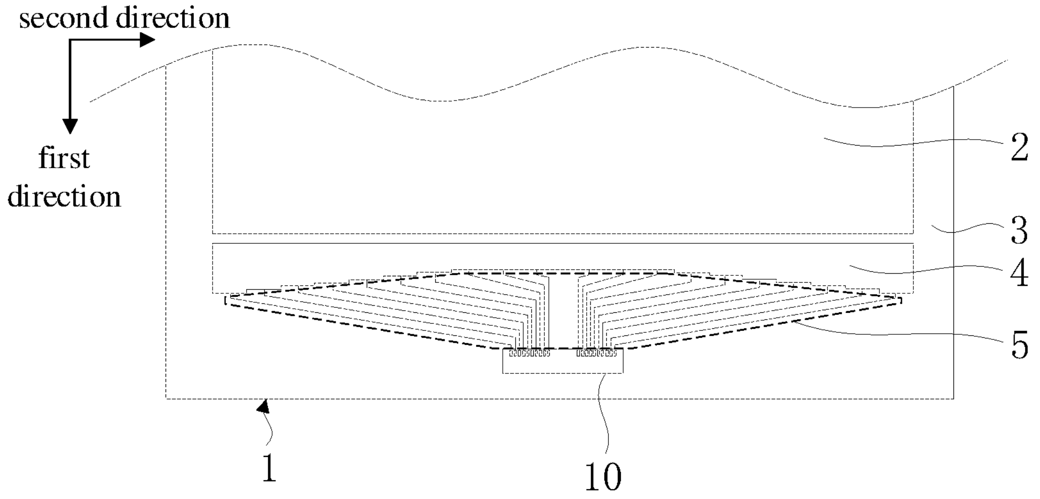
FIG. 2 is a structural schematic diagram of a display panel provided by an embodiment of the present disclosure.
Figure 3:
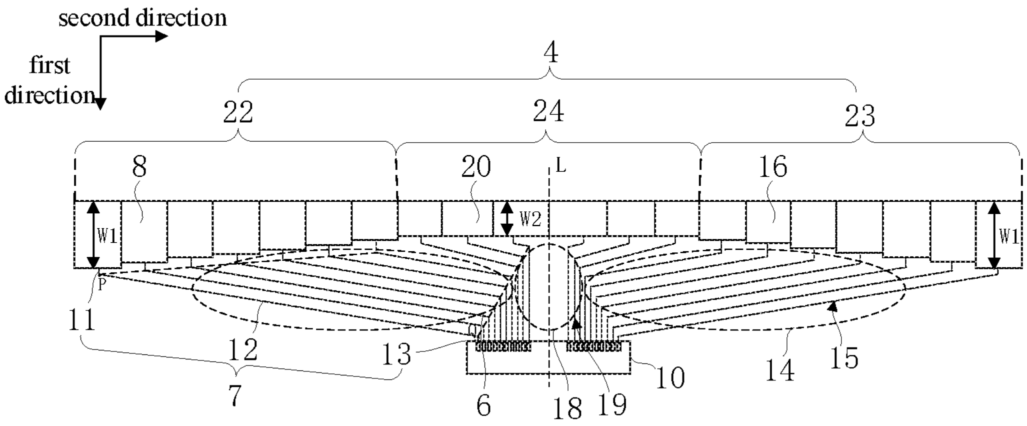
FIG. 3 is an enlarged schematic diagram of a circuit area, a fan-out wiring area, and a bonding area in FIG. 2.

As shown in FIG. 2 and FIG. 3, in order to solve above problems, an embodiment of the present disclosure provides a display panel 1, the display panel 1 includes a display area 2 and a non-display area 3 arranged around the display area 2. The non-display area 3 includes a circuit area 4 arranged adjacent to the display area 2 in a first direction (for example, a vertical downward direction) and a fan-out wiring area 5 arranged on a side of the circuit area 4 away from the display area 2. The fan-out wiring area 5 includes a first fan-out wiring group 6, the first fan-out wiring group 6 includes a plurality of first fan-out wirings 7 with lengths gradually decreasing in a second direction (for example, a horizontal rightward direction), and the second direction and the first direction are perpendicular to each other. The circuit area 4 includes a plurality of first sub-circuit areas 8 sequentially distributed in the second direction and connected with the plurality of first fan-out wirings 7 in a one-to-one correspondence. Sides of the plurality of first sub-circuit areas 8 close to the display area 2 are parallel to the second direction and are arranged on a same straight line, and widths W of the plurality of first sub-circuit areas 8 in the first direction gradually decrease in the second direction.

It should be noted that, in the present disclosure, lengths of fan-out wirings in the fan-out wiring area are positively related to impedance.

It can be understood that, heights of the plurality of first fan-out wirings 7 in the first direction gradually increase in the second direction.

Figure 4:
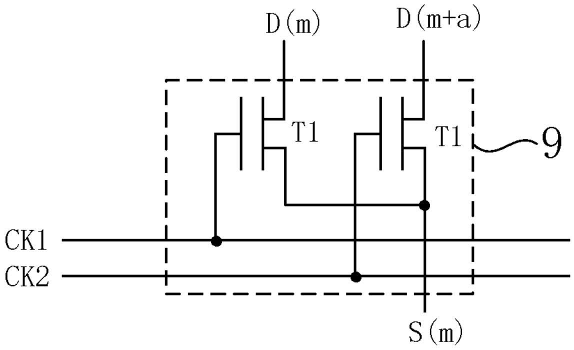
FIG. 4 is a schematic diagram of a first demultiplexer circuit provided by an embodiment of the present disclosure.

Specifically, as shown in FIG. 3 and FIG. 4, each of the first sub-circuit areas 8 disposed a first demultiplexer circuit 9. The first demultiplexer circuit 9 includes at least two first switching transistors T1 electrically connected with corresponding first fan-out wirings 7. And a number of the first switching transistors T1 in each of the first sub-circuit areas 8 is same. Channel sizes (for example, lengths of channels) of the first switching transistors T1 are positively related to the widths of the corresponding first sub-circuit areas 8 in the first direction. It should be noted that, a number of the first switching transistors T1 in the first demultiplexer circuit 9 is not limited in the embodiment of the present disclosure, and for convenience of description, the embodiment of the present disclosure is described by taking two first switching transistors T1 as examples.

It can be understood that, the greater the widths of the first sub-circuit areas 8 in the first direction, the larger areas of the first sub-circuit areas 8, and the larger the channel sizes of the first switching transistors T1 corresponding to the first sub-circuit areas 8.

In a specific embodiment, as shown in FIG. 4, each of the first demultiplexer circuit 9 includes the two first switching transistors T1 and two control signal lines (CK1, CK2) electrically connected to gates of the two first switching transistors T1 in a one-to-one correspondence. First poles of the two first switching transistors T1 are electrically and correspondingly connected to two data lines (D(m), D(m+a)) in the display area 2 respectively, wherein m and a are positive integers, and second poles of the two first switching transistors T1 are electrically connected to a same one of the first fan-out wirings 7 ((for example, S(m)). It can be understood that, the two control signal lines (CK1, CK2) are shared by the plurality of first sub-circuit areas 8. The first poles are any one of a source and a drain, and the second poles are one of the source and the drain different from the first poles. The first demultiplexer circuit 9 may transmit data signals on one of the first fan-out wirings 7 correspondingly to two different data lines in a time-sharing manner.

Specifically, for the first fan-out wirings 7 with larger impedance, in order to meet the pixel charging demand (ensure a normal transmission of the data signals), sizes (for example, projection areas in the direction perpendicular to the display panel 1) of the first sub-circuit areas 8 correspondingly connected thereto are designed to be larger. And for the first fan-out wirings 7 with smaller impedance, sizes of the first sub-circuit areas 8 correspondingly connected thereto may be designed to be smaller, as long as the pixel charging demand may be met. Since the impedance of the plurality of first fan-out wirings 7 in the first fan-out wiring group 6 gradually decreases in the second direction, therefore, the sizes of the plurality of the corresponding first sub-circuit areas 8 gradually decrease in the second direction. It can be understood that, the sizes of the first sub-circuit areas 8 in the present disclosure match the impedance of the corresponding first fan-out wirings 7 to meet the pixel charging demand.

Specifically, as shown in FIG. 3, the sides of the plurality of first sub-circuit areas 8 close to the display area 2 are parallel to the second direction and are arranged on the same straight line, and the widths of the plurality of first sub-circuit areas 8 in the first direction gradually decrease in the second direction, that is, sides of the plurality of the first sub-circuit areas 8 away from the display area 2 change gradually, and specific performance is as follows: the side of the circuit area 4 away from the display area 2 is concave toward the display area 2. Compared with the circuit area 4' in the exemplary display panel 1' shown in FIG. 1, an area of the circuit area 4 in the present disclosure is effectively reduced so that a position of the fan-out wiring area 5 may be moved in a direction towards the display area 2, thereby reducing an area of the non-display area 3 occupied by the circuit area 4 and the fan-out wiring area 5 and being conducive to realizing the narrow frame.

In a specific embodiment, the sides of the plurality of first sub-circuit 8 areas away from the display area 2 are in a stepped shape. Lengths of the sides of the first sub-circuit areas 8 close to the display area 2 are equal, and lengths of the sides of the first sub-circuit areas 8 away from the display area 2 are equal. It can be understood that, the sides of the first sub-circuit areas 8 away from the display area 2 are parallel to the second direction.

Specifically, as shown in FIG. 3, the non-display area 3 further includes a bonding area 10 arranged on a side of the fan-out wiring area 5 away from the circuit area 4. Each of the first fan-out wirings 7 includes a first wiring segment 11, a second wiring segment 12, and a third wiring segment 13 connected in sequence. An end of the first wiring segment 11 is connected with a corresponding one of the first sub-circuit areas 8, and another end of the first wiring segment 11 is connected with an end of the second wiring segment 12 at a first node P. Another end of the second wiring segment 12 is connected with an end of the third wiring segment 13 at a second node Q, and another end of the third wiring segment 13 is connected with the bonding area 10. And wiring segments formed by connecting the first nodes P in the plurality of the first fan-out wirings 7 with each other are arranged on a same straight line, and an included angle between an extending direction of the wiring segments and the first direction is an acute angle. Wiring segments formed by connecting the second nodes Q in the plurality of first fan-out wirings 7 with each other are arranged on a same straight line, and an included angle between an extending direction and the first direction is an acute angle.

In a specific embodiment, an extension direction of the first wiring segment 11 and the third wiring segment 13 are parallel to the first direction. An angle between the second wiring segment 12 and the first wiring segment 11 is an obtuse angle, and an angle between the second wiring segment 12 and the third wiring segment 13 is an obtuse angle.

Specifically, by adjusting an angle at which the extension direction of the second wiring segment 12 of each of the first fan-out wirings 7 deviates from the first direction, or adjusting pitches between the plurality of first fan-out wirings 7, the wiring segments formed by connecting the first nodes P of the plurality of first fan-out wirings 7 with each other are arranged on the same straight line, and the included angle between the extending direction and the first direction is the acute angle.

Specifically, as shown in FIG. 3, the fan-out wiring area 5 further includes a second fan-out wiring group 14 arranged side by side with the first fan-out wiring group 6 in the second direction. First fan-out wirings 7 with less lengths in the first fan-out wiring group 6 are arranged close to the second fan-out wiring group 14. And the second fan-out wiring group 14 includes a plurality of second fan-out wirings 15 with lengths gradually decreasing along a direction toward the first fan-out wiring group 6. Correspondingly, the circuit area 4 further includes a plurality of second sub-circuit areas 16 arranged side by side with the first sub-circuit areas 8 in the second direction. The plurality of second sub-circuit areas 16 are electrically connected to the plurality of second fan-out wirings 15 in a one-to-one correspondence. Sides of the plurality of second sub-circuit areas 16 and the plurality of first sub-circuit areas 8 close to the display area 2 are arranged on the same straight line, and widths of the plurality of the second sub-circuit areas 16 in the first direction gradually decrease in a direction toward the first sub-circuit areas 8.

Figure 5:
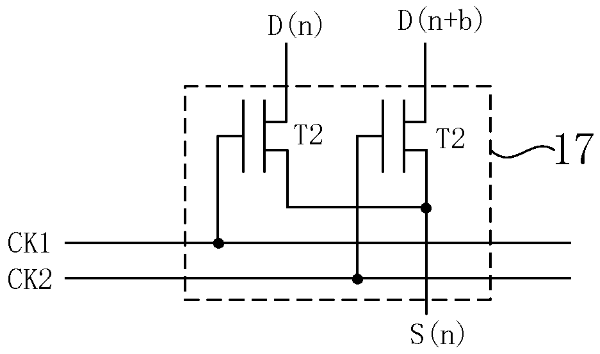
FIG. 5 is a schematic diagram of a second demultiplexer circuit provided by an embodiment of the present disclosure.

Specifically, as shown in FIG. 3 and FIG. 5, each of the second sub-circuit areas 16 is disposed with a second demultiplexer circuit 17. The second demultiplexer circuit 17 includes at least two second switching transistors T2 electrically connected with the corresponding second fan-out wirings 15. And a number of the second switching transistors T2 in each of the second sub-circuit areas 16 is same. Channel sizes of the second switching transistors T2 are positively related to the widths of the corresponding second sub-circuit areas 16 in the first direction.

In a specific embodiment, each of the second demultiplexer circuit 17 includes the two second switching transistors T2 and the two control signal lines (CK1, CK2) electrically connected to gates of the two second switching transistors T2 in a one-to-one correspondence. First poles of the two second switching transistors T2 are electrically and correspondingly connected to two data lines (D(n), D(n+b)) in the display area 2 respectively, wherein n and b are positive integers, and second poles of the two second switching transistors T2 are electrically connected to a same one of the second fan-out wirings 15 ((for example, S(n)). It can be understood that, the two control signal lines (CK1, CK2) are shared by the plurality of the second sub-circuit areas 16, and the second demultiplexer circuit 17 may transmit data signals on a corresponding one of the second fan-out wirings 15 to two different data lines in a time-sharing manner.

Specifically, the first fan-out wiring group 6 and the second fan-out wiring group 14 are axially symmetrical in the first direction, and the plurality of first sub-circuit areas 8 and the plurality of second sub-circuit areas 16 are axially symmetrical in the first direction. A number of the first switching transistors T1 in each of the first demultiplexer circuit 9 and a number of the second switching transistors T2 in each of the second demultiplexer circuit 17 are same.

It can be understood that, the plurality of second fan-out wirings 15 and the plurality of first fan-out wirings 7 are axially symmetrical in the first direction. Specifically, lengths of the plurality of second fan-out wirings 15 gradually decrease in a direction toward the first fan-out wiring group 6, and heights of the plurality of the second fan-out wirings 15 in the first direction gradually increase in the direction toward the first fan-out wirings group 6.

In a specific embodiment, referring to FIG. 3, the fan-out wiring area 5 further includes a third fan-out wiring group 18 arranged between the first fan-out wiring group 6 and the second fan-out wiring group 14. The third fan-out wiring group 18 includes a plurality of third fan-out wirings 19, a length of any one of the third fan-out wirings 19 is less than lengths of any ones of the first fan-out wirings 7 and the second fan-out wirings 15 arranged adjacent to the third fan-out wiring group 18.

Correspondingly, the circuit area 4 further includes a plurality of third sub-circuit areas 20 arranged between the plurality of first sub-circuit areas 8 and the plurality of second sub-circuit areas 16 and distributed in the second direction. And the plurality of third sub-circuit areas 20 are electrically connected to the plurality of third fan-out wirings 19 in a one-to-one correspondence. Sides of the plurality of third sub-circuit areas 20 and a plurality of the first sub-circuit areas 8 close to the display area 2 are arranged on a same straight line, and sides of the plurality of third sub-circuit areas 20 away from the display area 2 are arranged on a same straight line and parallel to the second direction. Widths of the plurality of third sub-circuit areas 20 in the first direction are less than widths of any ones of the first sub-circuit areas 8 and the second sub-circuit areas 16 adjacent to the third sub-circuit areas 20 in the first direction.

Specifically, in order to better distinguish the plurality of first sub-circuit areas 8, the plurality of second sub-circuit areas 16, and the plurality of third sub-circuit areas 20, an area occupied by the plurality of first sub-circuit areas 8 may be referred to as a first circuit area 22, an area occupied by the plurality of second sub-circuit areas 16 is referred to as a second circuit area 23, and an area occupied by the plurality of third sub-circuit areas 20 is referred to as a third circuit area 24. Wherein the first circuit area 22, the third circuit area 24, and the second circuit area 23 are adjacent in sequence.

Figure 6:
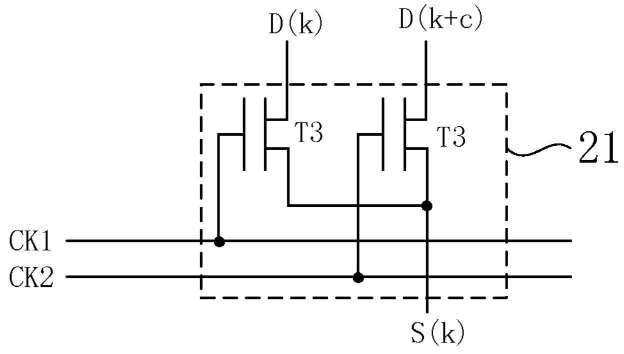
FIG. 6 is a schematic diagram of a third demultiplexer circuit provided by an embodiment of the present disclosure.

Specifically, as shown in FIG. 3 and FIG. 6, each of the plurality of third sub-circuit areas 20 is disposed with a third demultiplexer circuit 21. The third demultiplexer circuit 21 includes at least two third switching transistors T3 electrically connected with the corresponding third fan-out wirings 19. A number of the third switching transistors T3 in each of the third sub-circuit areas 20 is same. The channel sizes of the third switching transistors T3 are positively related to widths of the corresponding third sub-circuit areas 20 along the first direction. And the channel sizes of the third switching transistor T3 is less than the channel size of any one of the first switching transistors T1 and the channel size of any one of the second switching transistors T2. A number of the third switching transistors T3 in the third demultiplexer circuit 21 and a number of the second switching transistors T2 in the second demultiplexer circuit 17 are same.

It can be understood that, the two control signal lines are shared by the third demultiplexer circuit 21, the second demultiplexer circuit 17, and the first demultiplexer circuit 9.

In a specific embodiment, each of the third demultiplexer circuit 21 includes the two third switching transistors T3 and the two control signal lines (CK1, CK2) electrically connected to gates of the third second switching transistors T3 in a one-to-one correspondence. First poles of the two third switching transistors T3 are electrically and correspondingly connected to two data lines (D(k), D(k+c)) in the display area 2, respectively, wherein k and c are positive integers, and second poles of the two third switching transistors T3 are electrically connected to a same one of the third fan-out wirings 19 ((for example, S(k)). It can be understood that, the two control signal lines (CK1, CK2) are shared by the plurality of third sub-circuit areas 20, and the third demultiplexer circuit 21 may transmit data signals on a corresponding one of the third fan-out wirings 19 to two different data lines in a time-sharing manner.

In a specific embodiment, impedance of the plurality of third fan-out wirings 19 is same. And in another specific embodiment, the impedance of the plurality of third fan-out wirings 19 may be different, the present disclosure is not limited here.

Specifically, as shown in FIG. 3, the circuit area 4 and the fan-out wiring area 5 have a same symmetry axis L. Wherein, the plurality of first sub-circuit areas 8 and the plurality of second sub-circuit areas 16 are symmetrical about the symmetry axis L, and the plurality of third sub-circuit areas 20 are symmetrical about the symmetry axis L. The first fan-out wiring group 6 and the second fan-out wiring group 14 are symmetrical about the symmetry axis L, and the plurality of third fan-out wirings 19 in the third fan-out wiring group 18 are symmetrical about the symmetry axis L.

Specifically, the first switching transistors T1, the second switching transistors T2, and the third switching transistors T3 are all thin film transistors.

Specifically, the bonding area 10 is configured to bond a driver IC or a flexible circuit board. And the bonding area 10 includes a plurality of bonding pads connected in a one-to-one correspondence with ends of the plurality of first fan-out wirings 7, the plurality of second fan-out wirings 15, and the plurality of third fan-out wirings 19 away from the circuit area 4.

Figure 7:
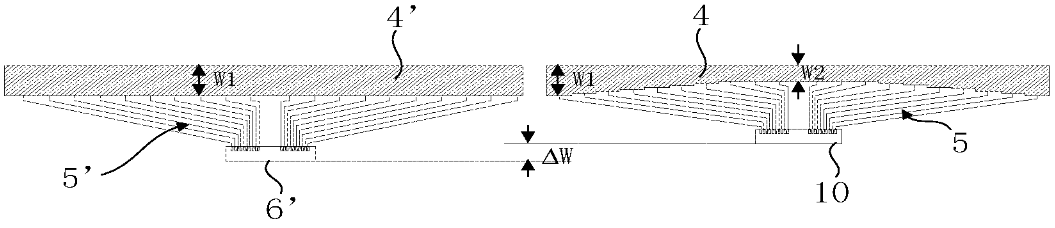
FIG. 7 is a comparison diagram of total heights of the circuit area, the fan-out wiring area, and the bonding area in the display panel provided by the embodiment of the present disclosure and the exemplary display panel provided by FIG. 1.

As shown in FIG. 7, a difference between a total height of the circuit area 4, the fan-out wiring area 5, and the bonding area 10 in the embodiment of the present disclosure in the first direction and a total height of the circuit area 4', the fan-out wiring area 5', and the bonding area 6' in the first direction shown in FIG. 1 is ΔW. It can be understood that, compared with the prior art, the lower frame in the present disclosure may be narrowed by ΔW toward the display area. In a specific embodiment, ΔW=W1−W2. Wherein, W1 is a maximum width of the circuit area 4 in the first direction, and W2 is a minimum width of the circuit area 4 in the first direction. Certainly, a value of ΔW is not limited here, and is specifically determined by a layout of fan-out wirings in the fan-out wiring area 5.

In the embodiment of the present disclosure, widths of the circuit area 4 formed by the first sub-circuit area 8, the second sub-circuit area 16, and the third sub-circuit area 20 in the first direction gradually decrease in a direction from two sides of the circuit area 4 to the symmetry axis L (for example, the width is decreased from W1 to W2), so that the side of the circuit area 4 away from the display area 2 is in a concave shape, effectively reducing an area occupied by the circuit area 4, making the fan-out wiring area 5 move towards the display area 2, and being conducive to realizing the narrow frame.

It should be noted that, in another embodiment, what is different from previous embodiments is that the circuit area 4 is only composed of the first sub-circuit area 8 and the second sub-circuit area 16. Correspondingly, the fan-out wiring area 5 is only composed of the first fan-out wiring group 6 and the second fan-out wiring group 14. Certainly, in another embodiment, the circuit area 4 may also only be composed of the first sub-circuit area 8 or the second sub-circuit area 16, and correspondingly, the fan-out wiring area 5 is only composed of the first fan-out wiring group 6 or the second fan-out wiring group 14. In these embodiments, the side of the circuit area 4 away from the display area 2 is concave, making the fan-out wiring area 5 move towards the display area 2 to be conducive to realizing a narrow frame of the display panel 1.

Figure 8:
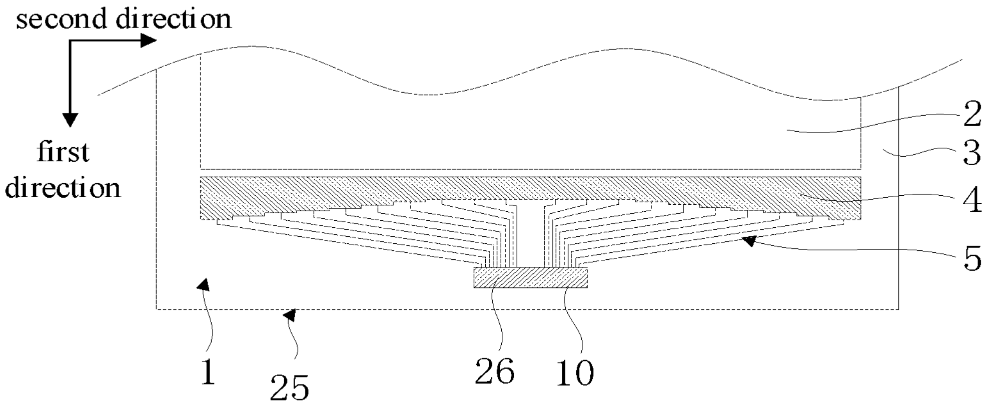
FIG. 8 is a structural schematic diagram of a display device provided by an embodiment of the present disclosure.

As shown in FIG. 8, the present disclosure further provides a display device 25, the display device 25 includes the display panel 1 of above-mentioned embodiments and a driving circuit board 26 electrically connected with the display panel 1. The driving circuit board 26 is electrically connected with sides of the first fan-out wiring group, the second fan-out wiring group, and the third fan-out wiring group in the fan-out wiring area 5 away from the circuit area 4. The driving circuit board 26 provides the data signals to the data lines of the display area 2 through the fan-out wirings in the fan-out wiring area 5 and a demultiplexer circuit of the circuit area 4.

Specifically, the driving circuit board 26 is a driving IC or a flexible circuit board, and the driving circuit board 26 is bonded and connected to the bonding area 10, thereby realizing an electrical connection with the fan-out wirings in the fan-out wiring area 5.

In the embodiment, the width of the circuit area 4 in the first direction gradually decreases in a direction from both sides to a middle area, so that the side of the circuit area 4 away from the display area 2 is in a concave shape. On a basis of meeting the pixel charging demand, the area occupied by the circuit area 4 is effectively reduced, making the fan-out wiring area 5 move towards the display area 2 to be conducive to realizing a narrow frame of the display device 25.

In the foregoing embodiments, the description of each of the embodiments has respective focuses. For a part that is not described in detail in an embodiment, reference may be made to relevant descriptions in other embodiments. Details are not further described here.

The display panel and display device provided in the embodiments of the present disclosure are described in detail above. The principle and implementations of the present disclosure are described in this specification by using specific examples. The description about the foregoing embodiments is merely provided to help understand the method and core ideas of the present disclosure. Those of ordinary skill in the art should understand that they can still make modifications to the technical solutions described in the foregoing embodiments, or perform equivalent replacements to some of the technical features; and these modifications or replacements do not make the essence of the corresponding technical solutions depart from The scope of the technical solutions of the embodiments of the present disclosure.

What is claimed is:

1. A display panel, comprising a display area and a non-display area arranged around the display area; wherein the non-display area comprises a circuit area arranged adjacent to the display area in a first direction and a fan-out wiring area arranged on a side of the circuit area away from the display area;

wherein the fan-out wiring area comprises a first fan-out wiring group and a second fan-out wiring group arranged side by side with the first fan-out wiring group in a second direction, the first fan-out wiring group comprises a plurality of first fan-out wirings with lengths gradually decreasing in the second direction, and the second direction and the first direction are perpendicular to each other;

wherein the circuit area comprises a plurality of first sub-circuit areas sequentially distributed in the second direction and connected with the plurality of first fan-out wirings in a one-to-one correspondence; sides of the plurality of first sub-circuit areas close to the display area are parallel to the second direction and are arranged on a same straight line, and widths of the plurality of the first sub-circuit areas in the first direction gradually decrease in the second direction;

the first fan-out wirings with smaller lengths in the first fan-out wiring group are arranged close to the second fan-out wiring group; and the second fan-out wiring group comprises a plurality of second fan-out wirings with lengths gradually decreasing in a direction toward the first fan-out wiring group;

the circuit area further comprises a plurality of second sub-circuit areas arranged side by side with the first sub-circuit areas in the second direction; the plurality of second sub-circuit areas are electrically connected to the plurality of second fan-out wirings in a one-to-one correspondence; sides of the plurality of second sub-circuit areas and the plurality of first sub-circuit areas close to the display area are arranged on the same straight line, and widths of the plurality of the second sub-circuit areas in the first direction gradually decrease in a direction toward the first sub-circuit areas.

2. The display panel according to claim 1, wherein sides of the plurality of first sub-circuit areas away from the display area are in a stepped shape.

3. The display panel according to claim 1, wherein each of the first sub-circuit areas is disposed with a first demultiplexer circuit, the first demultiplexer circuit comprises at least two first switching transistors electrically connected with the corresponding first fan-out wirings; and a number of the first switching transistors in each of the first sub-circuit areas is same;

channel sizes of the first switching transistors are positively related to the widths of the corresponding first sub-circuit areas in the first direction.

4. The display panel according to claim 1, wherein the non-display area further comprises a bonding area arranged on a fan-out wiring area away from the circuit area;

each of the first fan-out wirings comprises a first wiring segment, a second wiring segment, and a third wiring segment connected in sequence; an end of the first wiring segment is connected with a corresponding one of the first sub-circuit areas, and another end of the first wiring segment is connected with an end of the second wiring segment at a first node; another end of the second wiring segment is connected with an end of the third wiring segment at a second node, and another end of the third wiring segment is connected with the bonding area;

wiring segments formed by connecting the first nodes in the plurality of first fan-out wirings with each other are arranged on a same straight line, and an included angle between an extending direction and the first direction is an acute angle; wiring segments formed by connecting the second nodes in the plurality of first fan-out wirings with each other are arranged on a same straight line, and an included angle between an extending direction and the first direction is an acute angle.

5. The display panel according to claim 1, wherein each of the second sub-circuit areas comprises a second demultiplexer circuit, the second demultiplexer circuit comprises at least two second switching transistors electrically connected with the corresponding second fan-out wirings; and a number of the second switching transistors in each of the second sub-circuit areas is same;

channel sizes of the second switching transistors are positively related to the widths of the corresponding second sub-circuit areas in the first direction.

6. The display panel according to claim 5, wherein the first fan-out wiring group and the second fan-out wiring group are axially symmetrical in the first direction, and the plurality of first sub-circuit areas and the plurality of second sub-circuit areas are axially symmetrical in the first direction.

7. The display panel according to claim 1, wherein the fan-out wiring area further comprises a third fan-out wiring group arranged between the first fan-out wiring group and the second fan-out wiring group; the third fan-out wiring group comprises a plurality of third fan-out wirings, and a length of any one of the third fan-out wirings is less than the length of any one of the first fan-out wirings and any one of the second fan-out wirings arranged adjacent to the third fan-out wiring group;

the circuit area further comprises a plurality of third sub-circuit areas arranged between the plurality of first sub-circuit areas and the plurality of second sub-circuit areas and distributed in the second direction; and the plurality of third sub-circuit areas are electrically connected to the plurality of third fan-out wirings in a one-to-one correspondence;

sides of the plurality of third sub-circuit areas and the plurality of first sub-circuit areas close to the display area are arranged on the same straight line, and sides of the plurality of third sub-circuit areas away from the display area are arranged on a same straight line and parallel to the second direction; and widths of the plurality of the third sub-circuit areas in the first direction are less than the widths of any one of the first sub-circuit areas and any one of the second sub-circuit areas adjacent to the third sub-circuit areas in the first direction.

8. The display panel according to claim 7, wherein each of the plurality of third sub-circuit areas is disposed with a third demultiplexer circuit, the third demultiplexer circuit comprises at least two third switching transistors electrically connected with the corresponding third fan-out wirings; and a number of the third switching transistors in each of the third sub-circuit areas is same;

channel sizes of the second switching transistors are positively related to widths of the corresponding third sub-circuit areas in the first direction.

9. The display panel according to claim 7, wherein a number of the first switching transistors in the first sub-circuit areas is equal to a number of the second switching transistors in the second sub-circuit areas, and equal to a number of the third switching transistors in the third sub-circuit areas.

10. A display device, comprising a display panel and a driving circuit board electrically connected with the display panel, wherein the display panel comprises a display area and a non-display area arranged around the display area; the non-display area comprises a circuit area arranged adjacent to the display area in a first direction and a fan-out wiring area arranged on a side of the circuit area away from the display area;

wherein the fan-out wiring area comprises a first fan-out wiring group and a second fan-out wiring group arranged side by side with the first fan-out wiring group in a second direction, the first fan-out wiring group comprises a plurality of first fan-out wirings with lengths gradually decreasing in the second direction, and the second direction and the first direction are perpendicular to each other;

the circuit area comprises a plurality of first sub-circuit areas sequentially distributed in the second direction and connected with the plurality of first fan-out wirings in a one-to-one correspondence; sides of the plurality of first sub-circuit areas close to the display area are parallel to the second direction and are arranged on a same straight line, and widths of the plurality of the first sub-circuit areas in the first direction gradually decrease in the second direction;

the first fan-out wirings with smaller lengths in the first fan-out wiring group are arranged close to the second fan-out wiring group; and the second fan-out wiring group comprises a plurality of second fan-out wirings with lengths gradually decreasing in a direction toward the first fan-out wiring group;

the circuit area further comprises a plurality of second sub-circuit areas arranged side by side with the first sub-circuit areas in the second direction; the plurality of second sub-circuit areas are electrically connected to the plurality of second fan-out wirings in a one-to-one correspondence; sides of the plurality of second sub-circuit areas and the plurality of first sub-circuit areas close to the display area are arranged on the same straight line, and widths of the plurality of the second sub-circuit areas in the first direction gradually decrease in a direction toward the first sub-circuit areas; and the driving circuit board is electrically connected with a side of the first fan-out wiring group away from the circuit area.

11. The display device according to claim 10, wherein sides of the plurality of first sub-circuit areas away from the display area are in a stepped shape.

12. The display device according to claim 10, wherein each of the first sub-circuit areas is disposed with a first demultiplexer circuit, the first demultiplexer circuit comprises at least two first switching transistors electrically connected with the corresponding first fan-out wirings; and a number of the first switching transistors in each of the first sub-circuit areas is same;

channel sizes of the first switching transistors are positively related to widths of the corresponding first sub-circuit areas in a first direction.

13. The display device according to claim 10, wherein a non-display area further comprises a bonding area arranged on a fan-out wiring area away from the circuit area;

each of the first fan-out wirings comprises a first wiring segment, a second wiring segment, and a third wiring segment connected in sequence; an end of the first wiring segment is connected with a corresponding one of the first sub-circuit areas, and another end of the first wiring segment is connected with an end of the second wiring segment at a first node; another end of the second wiring segment is connected with an end of the third wiring segment at a second node, and another end of the third wiring segment is connected with the bonding area;

wiring segments formed by connecting the first nodes in the plurality of first fan-out wirings with each other are arranged on a same straight line, and an included angle between an extending direction and the first direction is an acute angle; wiring segments formed by connecting the second nodes in the plurality of first fan-out wirings are arranged on a same straight line, and an included angle between an extending direction of the wiring segments and the first direction is an acute angle.

14. The display device according to claim 10, wherein each of the second sub-circuit areas comprises a second demultiplexer circuit, the second demultiplexer circuit comprises at least two second switching transistors electrically connected with the corresponding second fan-out wirings; and a number of the second switching transistors in each of the second sub-circuit areas is same;

channel sizes of the second switching transistors are positively related to widths of the corresponding second sub-circuit areas in the first direction.

15. The display device according to claim 14, wherein the first fan-out wiring group and the second fan-out wiring group are axially symmetrical in the first direction, and the plurality of first sub-circuit areas and the plurality of second sub-circuit areas are axially symmetrical in the first direction.

16. The display device according to claim 10, wherein the fan-out wiring area further comprises a third fan-out wiring group located between the first fan-out wiring group and the second fan-out wiring group; the third fan-out wiring group comprises a plurality of third fan-out wirings, and a length of any one of the third fan-out wirings is less than the length of any one of the first fan-out wirings arranged adjacent to the third fan-out wiring group and a length of any one of the second fan-out wirings arranged adjacent to the third fan-out wiring group;

the circuit area further comprises a plurality of third sub-circuit areas arranged between the plurality of first sub-circuit areas and the plurality of second sub-circuit areas and distributed in the second direction; and the plurality of third sub-circuit areas are electrically connected to the plurality of third fan-out wirings in a one-to-one correspondence;

sides of the plurality of third sub-circuit areas close to the display area and the sides of the plurality of first sub-circuit areas close to the display area are arranged on a same straight line, and sides of the plurality of third sub-circuit areas away from the display area are arranged on a same straight line and parallel to the second direction; and widths of the plurality of third sub-circuit areas in the first direction is less than the width of any one of the first sub-circuit areas adjacent to the third sub-circuit areas in the first direction and the width of any one of the second sub-circuit areas adjacent to the third sub-circuit areas in the first direction.

17. The display device according to claim 16, wherein each of the plurality of third sub-circuit areas is disposed with a third demultiplexer circuit, the third demultiplexer circuit comprises at least two third switching transistors electrically connected with the corresponding third fan-out wirings; and a number of the third switching transistors in each of the third sub-circuit areas is same;

channel sizes of the third switching transistors are positively related to widths of the corresponding third sub-circuit areas in the first direction.

18. The display device according to claim 16, wherein a number of the first switching transistors in the first sub-circuit areas is equal to a number of the second switching transistors in the second sub-circuit areas, and equal to a number of the third switching transistors in the third sub-circuit areas, in the cycle unit, and electrical levels of the complementary level for color shift compensation of the data signal provided by the 4th terminal, the 6th terminal, the 7th terminal, the 9th terminal, the 12th terminal, the 14th terminal, and the 15th terminal are equal to the electrical level of the complementary level for color shift compensation of the data signal provided by the 1st terminal in the cycle unit.

* * * * *